United States Patent
Yang et al.

(10) Patent No.: US 12,296,846 B2
(45) Date of Patent: May 13, 2025

(54) METHODS AND APPARATUS FOR NATURAL LANGUAGE BASED SCENARIO DISCOVERY TO TRAIN A MACHINE LEARNING MODEL FOR A DRIVING SYSTEM

(71) Applicant: PlusAI, Inc., Cupertino, CA (US)

(72) Inventors: Yang Yang, Fremont, CA (US); Anurag Paul, Campbell, CA (US); Yu Sun, Santa Clara, CA (US)

(73) Assignee: PlusAI, Inc., Santa Clara, CA (US)

( * ) Notice: Subject to any disclaimer, the term of this patent is extended or adjusted under 35 U.S.C. 154(b) by 126 days.

(21) Appl. No.: 17/829,484

(22) Filed: Jun. 1, 2022

(65) Prior Publication Data

US 2023/0391357 A1    Dec. 7, 2023

(51) Int. Cl.
*G06F 16/55* (2019.01)
*B60W 60/00* (2020.01)
*G06F 16/535* (2019.01)
*G06V 20/58* (2022.01)

(52) U.S. Cl.
CPC ......... *B60W 60/001* (2020.02); *G06F 16/535* (2019.01); *G06F 16/55* (2019.01); *G06V 20/58* (2022.01); *B60W 2420/403* (2013.01)

(58) Field of Classification Search
CPC ............................... G06F 16/55; G06F 16/535
USPC ...................................................... 707/758
See application file for complete search history.

(56) References Cited

U.S. PATENT DOCUMENTS

| | | | |
|---|---|---|---|
| 11,157,813 B1* | 10/2021 | Je | G06V 10/764 |
| 2013/0191310 A1* | 7/2013 | Awadallah | G06F 16/33 706/12 |
| 2015/0305663 A1* | 10/2015 | Roots | A61B 5/168 600/595 |
| 2018/0082152 A1* | 3/2018 | Katz | H04H 60/66 |
| 2018/0232601 A1* | 8/2018 | Feng | G06F 18/2115 |
| 2020/0193206 A1* | 6/2020 | Turkelson | G06T 5/009 |
| 2021/0158095 A1* | 5/2021 | Büttner | G06F 18/2148 |
| 2021/0390353 A1* | 12/2021 | Futatsugi | G06V 10/87 |
| 2022/0114476 A1* | 4/2022 | Bui | G06N 3/084 |
| 2022/0237897 A1* | 7/2022 | Heinzemann | G06T 7/35 |
| 2023/0051565 A1* | 2/2023 | Cower | G06V 20/56 |

* cited by examiner

*Primary Examiner* — Kimberly L Wilson
(74) *Attorney, Agent, or Firm* — Sheppard Mullin Richter & Hampton LLP

(57) ABSTRACT

A method for classifying environmental image frames for vehicles, using a universal iterative classification model, is presented. The method combines text-based querying, active machine-learning models, and user input to form an end-to-end automatic flow for sourcing video frames captured by sensors on a vehicle. An index of frames is used and continuously populated with data for new frames, with each frame scored on its likelihood of containing a representation of a driving scenario of interest. Each iteration of the classification model produces a classification result that is predicted to belong to the scenario of interest. Binary labels can be applied to the results. Subsequent iterative training of classification models can be performed using updated training sets containing previously labeled classification results, to improve precision and accuracy in classifying image data to a driving scenario.

20 Claims, 3 Drawing Sheets

METHODS AND APPARATUS FOR NATURAL LANGUAGE BASED SCENARIO DISCOVERY TO TRAIN A MACHINE LEARNING MODEL FOR A DRIVING SYSTEM

FIELD

The present disclosure generally relates to methods and apparatus for natural language-based scenario discovery to train a machine-learning model for a vehicle driving system.

BACKGROUND

Self-driving (and assisted driving) relies heavily on machine learning models, for example to recognize lanes and obstacles from video frames, and to predict the trajectories of other cars. The performance of machine-learning models, such as their ability to correctly predict their intended tasks, heavily depends on what training set is used to train these models. Oftentimes, scenarios of critical importance to driving safety occur relatively infrequently. For example, a slippery road surface, rainy conditions, glare from the sun, ice on the road, traffic accidents, the presence of emergency vehicles, road work, debris scattered on road, etc., are obstacles that can be encountered by vehicles/drivers. Known machine-learning models, however, are typically limited to making predictions on previously encountered/"seen" scenarios. In other words, a machine-learning model typically has a lower predictive accuracy for scenarios on which it has not previously been trained.

SUMMARY

In some embodiments, a non-transitory, processor-readable medium for natural language-based scenario discovery to train a machine-learning model for a driving system is presented. The non-transitory, processor-readable medium stores instructions to cause the processor to query a first set of image data, to produce results including a first subset of image data. The memory also stores instructions to cause the processor to receive a first set of labels for the first subset of image data, and train a classification model (e.g., a binary classification model) based on the first set of labels and the first subset of image data, to produce a first trained classification model (e.g., a first trained binary classification model). The memory also stores instructions to cause the processor to generate, using the first trained classification model, a first plurality of scores for a second set of image data different from the first set of image data and identify a first subset of scores from the first plurality of scores. Each score from the first subset of scores has a score higher than each remaining score from the first plurality of scores. The first subset of scores is associated with a second subset of image data. The memory also stores instructions to cause the processor to receive a second set of labels for the second subset of image data and train the first trained classification model based on the second set of labels and the second subset of image data to produce a second trained classification model (e.g., a second trained binary classification model). The memory also stores instructions to cause the processor to generate, using the second trained classification model, a second plurality of scores for a third set of image data different from the first set of image data and the second set of image data and identify a second subset of scores from the second plurality of scores, each score from the second subset of scores having a score higher than a score of each remaining scores from the second plurality of scores. The second subset of scores is associated with a third subset of image data. The memory also stores instructions to cause the processor to receive a third set of labels for the third subset of image data, and to train the second trained classification model based on the third set of labels and the third subset of image data, to produce a third trained classification model (e.g., a third trained binary classification model). The memory also stores instructions to cause the processor to generate, using the third trained classification model, a third plurality of scores for a fourth set of image data different from the first set of image data, the second set of image data, and the third set of image data, and to identify a third subset of scores from the third plurality of scores. Each score from the third subset of scores has a score higher than each remaining score from the third plurality of scores. The third subset of scores is associated with a fourth subset of image data. The memory also stores instructions to cause the processor to receive a fourth set of labels for the fourth subset of image data, and to train the third trained classification model based on the fourth set of labels and the fourth subset of image data, to produce a fourth trained classification model (e.g., a fourth trained binary classification model). The memory also stores instructions to cause an update to a multi-task machine learning model of a vehicle such that the multi-task machine learning model of a vehicle includes the fourth trained binary classification model.

In some embodiments, a method for natural language-based scenario discovery to train a machine-learning model for a driving system is presented. The method includes querying a first set of image data, to produce results including a first subset of image data, and receiving a first set of labels for the first subset of image data. The method also includes training a classification model (e.g., a binary classification model) based on the first set of labels and the first subset of image data, to produce a first trained classification model (e.g., a first trained binary classification model), and iteratively retraining the first trained classification model to produce a second trained classification model (e.g., a second trained binary classification model). The iterative retraining includes a plurality of iterations. For each retraining iteration, the method also includes generating, via the processor, a plurality of scores for a next set of image data different from the first set of image data, and identifying a subset of scores from the plurality of scores. Each score from the subset of scores can have a score higher than each remainder score from the plurality of scores, the subset of scores being associated with a next subset of image data different from the first subset of image data. The method also includes receiving, at the processor, a next set of labels for the next subset of image data, and training a latest version of the first trained classification model based on the next set of labels and the next subset of image data. The method further includes updating a multi-task machine learning model of a vehicle such that the multi-task machine learning model of the vehicle includes the second trained classification model.

In some embodiments, a system for natural language-based scenario discovery to train a machine-learning model for a driving system is presented. The system includes a processor located at a vehicle (e.g., an autonomous vehicle), the vehicle including at least one camera and a memory operably coupled to the processor. The memory stores instructions to cause the processor to receive a plurality of video frames associated with a surrounding region of the vehicle, the plurality of video frames captured by the at least one camera of the vehicle. The memory also stores instructions to cause the processor to classify each video frame from the plurality of video frames using a multi-task machine learning model of the vehicle to produce a plurality of classified video frames, the multi-task machine learning model including a plurality of classification models (e.g., a plurality of binary classification models). Each classification model from the plurality of classification models is uniquely associated with a scenario from a plurality of scenarios. The memory further stores instructions to cause the processor to identify at least one classified video frame from the plurality of classified video frames as being associated with a scenario of interest from the plurality of scenarios, and in response to identifying the at least one classified video frame from the plurality of classified video frames as being associated with the scenario of interest, at least one of store a representation of an occurrence of the scenario of interest in the memory or cause transmission of the representation of the occurrence of the scenario of interest to a remote server for updating an associated classification model (e.g., an associated binary classification model) from the plurality of binary classification models.

BRIEF DESCRIPTIONS OF THE DRAWINGS

The drawings show aspects of one or more embodiments of the disclosure. It should be understood, however, that the present disclosure is not limited to the precise arrangements and instrumentalities shown in the drawings, wherein.

DETAILED DESCRIPTION

Figure 1:
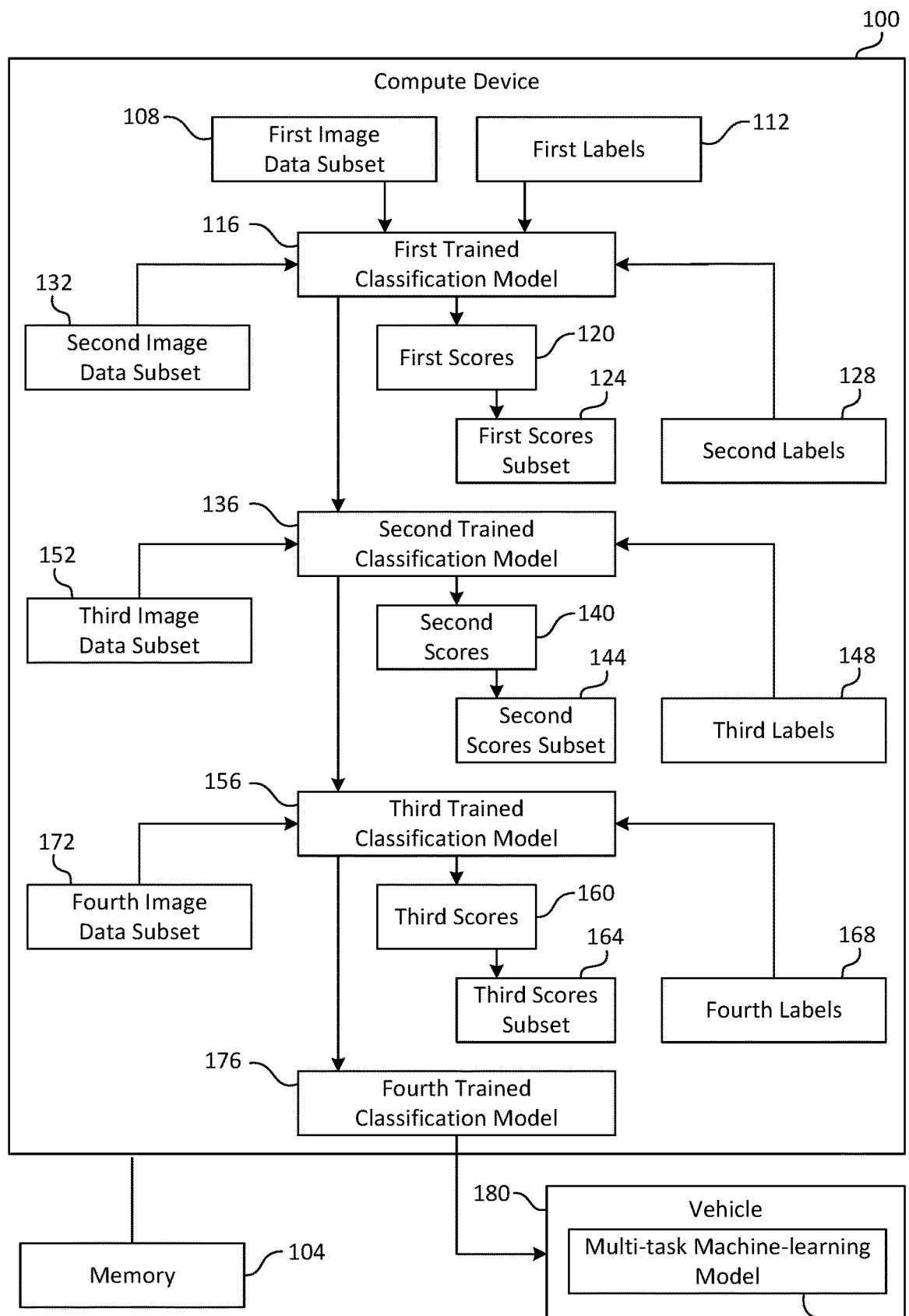
FIG. 1 is a flow diagram showing operation of an end-to-end machine-learning model, in accordance with some embodiments.

Systems and methods for performing natural language based scenario discovery in a vehicle (e.g., an autonomous vehicle) are presented herein. In some implementations, an end-to-end machine-learning model of a vehicle is trained based on video frames received from one or more video sources. An "end-to-end machine-learning model," as used in this disclosure, can be for example a type of machine-learning model that uses a technique where the model learns all the steps between the initial input phase and the final output result. This is a deep learning process where all of the different parts are simultaneously trained instead of sequentially. In an embodiment, a classification model (e.g., a binary classification model) is used by the vehicle to analyze and/or classify each incoming video frame from a plurality of incoming video frames. The classification model can output a binary "yes"/"no" that specifies whether the incoming frame belongs to a certain driving scenario. Alternatively or in addition, the classification model can use an intermediate layer result from one or more existing perception models (such as a deep neural network) as its own input, to reduce the computational load and memory resources consumed by the classification model (which may be "on vehicle"). The end-to-end machine-learning model can also be used to create multiple classification models (e.g., multiple binary classification models) for multiple different scenarios, such that each classification model can be used to detect occurrences of one or more scenarios associated with that classification model.

Some embodiments described herein include generating/compiling training sets for classification models (e.g., binary classification models) and/or sourcing data for use in detecting vehicular scenarios. In some embodiments, an image search can be conducted as part of a process for sourcing data for a particular/specified scenario of interest, for example when a compute device already has information describing that particular scenario of interest. Each classification model can build an index from all the video frames data collected, then search for examples of the desired scenario among the indices. Depending on the implementation, a variety of different methods of querying can be used to search for examples of the desired scenario. For example, the classification model can use a textual description of the scenario as a query for the index. The classification model can be trained based on text-image co-occurrence, such that with a text query, it returns the most relevant images. In an embodiment, the classification model can generate another classification model (e.g., a binary classification model) associated with the specific scenario to be trained on text-image co-occurrence. After the above textual query returns some results, a rectangular patch of a good matching frame can be selected and an image embedding representation of that patch can be constructed for use in querying. When a text query returns no good matching candidates, a stored/pre-existing image can be input to the classification model as a good example of the desired scenario, and an embedding representing that desired scenario can be constructed and queried. In other words, the results of the image search and/or sourcing are the frames produced by the classification model and/or specific scenario model where those frames have an accuracy above some accuracy threshold that the model applies in its predictions when selecting frames that belong to a scenario queried by the image search. The predicted frames are a subset of frames from an index and/or repository of frames the classification model and/or specific scenario model determines satisfy the image search and/or sourcing. To verify the model's predicted subset of frames, each frame of that subset is assigned with a binary label such as "yes"/"no" or "0"/"1" by a human confirming if a predicted frame belongs to the scenario indicated by the query. Such labeled search results from the initial version of a training set for the classification models are discussed below. The process described above denotes the initial iterative training process of the classification model and/or scenario specific model.

Some embodiments of the present disclosure include retraining a classification model (e.g., a binary classification model). Given a labeled training set (e.g., including "0"/"1" labels, as discussed above), the binary classification model can be trained and used to assign a score to each frame, each score indicating how likely the associated frame is to belong to a predefined scenario of interest. The top-scoring K frames, where K is an integer describing the number of frames for a subset of frames, are then labeled (e.g., in response to user inputs received via a graphical user interface (GUI)), and the newly-labeled (e.g., 0/1) frames are again added to the training set. In some implementations, the foregoing process is repeated N times, where N is an integer describing the number of iterations of the process of retraining a classification model (e.g., a binary classification model), or until an associated precision/recall metric as shown in the labeling reaches or exceeds a predefined desired level. A "precision/recall metric," as used in this disclosure, can be for example a standard of measurement for a precision benchmark that governs whether a classification model (e.g., a binary classification model) and/or its predicted frames are to be recalled. For example, a classification model can be restricted with a precision/recall metric of at least 75% in which if the classification model falls below 75%, the classification model and/or its predicted frames are recalled. A number of iterations for training the classification model can be, for example, 5 or more iterations.

Some embodiments of the present disclosure include classifying video and/or image frames depicting scenarios of interest using a processor and a non-transitory, computer readable medium on a vehicle. For example, multiple different scenario models implemented as different classification models (e.g., binary classification models) can be added to a processor of the same vehicle, each configured to detect a different scenario of interest. In some such implementations, after one or more classification models have been fully trained, they can be deployed onto a processor of the vehicle and used to analyze video frames and detect scenarios as the vehicle moves in real time. Using trained classification models described herein, frames belonging to certain scenarios can be identified faster and more accurately than is possible using known systems. Moreover, new frames captured by cameras on the vehicle can be classified, labeled, and/or added to the training set for the classification model, making a more robust model throughout the driving process.

In some embodiments, driver behavior can be monitored, based on a surrounding environment of a vehicle and/or based on in-vehicle actions performed by a driver of the vehicle. The surrounding environment of the vehicle can also be analyzed (e.g., using a classification model as described herein) to determine a set of responses that are acceptable for the driver to perform and/or a set of responses that are not acceptable for the driver to perform given the surrounding environment. Thereafter, the in-vehicle actions of the driver can be inferred using, for example, control area network (CAN) bus data, and compared to the set of responses that are acceptable for the driver to perform and/or the set of responses that are not acceptable for the driver to perform given the surrounding environment. A determination can also be made as to whether a remedial action should occur based on actions of the driver. Such remedial actions can include recommending the driver to receive further training and/or adjusting a mode of operation of the vehicle.

Furthermore, in some implementations, data from a fleet including multiple vehicles (e.g., autonomous vehicles) can be received and/or analyzed to generate and/or update a software model that can monitor not only road conditions and hazards, but also rare scenarios contingent on driver behavior for the fleet. In some instances, the software model can identify common road conditions and rare conditions that can be unknown or unfamiliar to the software model. Alternatively or additionally, the software model can identify anomalous driving behavior of one or more drivers associated with the fleet, undesirable driving behaviors for one or more drivers associated with the fleet, one or more drivers associated with the fleet that could use additional training, and/or the like. In some instances, third party driving behavior from vehicles outside the fleet can be detected and categorized as, and/or in the context of, a road condition and/or hazard. In some instances, techniques described herein increase overall safety of vehicles on roads. Drivers that are exhibiting risky behavior can be identified, and mitigating actions can take place. Increased safety at roads can have multiple advantages, such as reducing risk of traffic accidents and saving lives.

Furthermore, in some implementations, techniques described herein can consider CAN bus data from a vehicle instead of and/or in addition to sensor data. Some actions of the vehicle and/or driver can be determined faster using CAN bus data than sensor data. As such, the actions of the vehicle and/or driver can be determined and/or compared to the set of actions that are acceptable for the vehicle to perform, actions that are not acceptable for the vehicle to perform, responses that are acceptable for the driver to perform and/or the set of responses that are not acceptable for the driver to perform in a faster manner (e.g., ~200-300 milliseconds earlier).

Furthermore, in some instances, the techniques described herein can be applied to heavy vehicles, such as semi-trucks. Due to their relatively larger weight and size, heavy vehicles and/or drivers of heavy vehicles encountering unsafe scenarios or exhibiting undesirable behavior can be riskier than, for example, light trucks and/or drivers of light trucks. As such, ensuring that heavy vehicles and/or drivers of heavy vehicles are not exhibiting undesirable behaviors can be particularly desirable (e.g., compared to vehicles that are lighter than heavy vehicles). A "scenario," as used in this disclosure, can be for example an occurrence within the surroundings of a vehicle. In a non-limiting embodiment, a scenario can include slippery road surface, rainy days, glare from sun, ice on road, traffic accident in front of car, emergency vehicles, road work, debris scattered on road, or the like thereof. A query can include a text query, image query, text-to-image query, or the like thereof, that specifies a scenario of interest. A "scenario of interest," as used in this disclosure, can be for example a specific scenario that a classification model (e.g., a binary classification model) is intended to identify related to driving.

Referring now to FIG. 1, a flow diagram is presented, showing operation of an end-to-end machine-learning model, in accordance with some embodiments. More specifically, FIG. 1 shows data stored in, and data flows processed by, a compute device 100. Compute device 100 can include any compute device as described in this disclosure, including without limitation a microcontroller, microprocessor, digital signal processor (DSP) and/or system on a chip (SoC) as described in this disclosure. Compute device 100 can include, be included in, and/or connect with a mobile device such as a mobile telephone or smartphone. Compute device 100 can include a single compute device 100 operating independently or can include two or more compute devices 100 operating in concert, in parallel, sequentially or the like. Compute device 100 can interface or connect with one or more additional devices as described below in further detail via a network interface device (not shown in FIG. 1). A network interface device can be used for connecting compute device 100 to one or more of a variety of networks, and/or to one or more remote compute devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an association, a building, a campus or other relatively small geographic space), a telephone network, a data network associated with a telephone/voice provider (e.g., a mobile communications provider data and/or voice network), a direct connection between two compute devices, and any combinations thereof. A network can employ a wired and/or a wireless mode of communication. In general, any network topology can be used. Information (e.g., data, software etc.) can be transmitted to and/or from a computer and/or a compute device 100. Compute device 100 can include but is not limited to, for example, a compute device 100 or cluster of compute devices 100. Compute device 100 can include one or more compute devices 100 dedicated to data storage, security, dispersal of traffic for load balancing, and the like. Compute device 100 can distribute one or more computing tasks as described below across multiple compute devices 100, which can operate in parallel, in series, redundantly, or in any other manner used for dispersal of tasks or memory between compute devices 100.

With continued reference to FIG. 1, compute device 100 can be designed and/or configured to perform any method, method step, or sequence of method steps in any embodiment described in this disclosure, in any order and with any degree of repetition. For example, compute device 100 can be configured to perform a single step or sequence recurrently until a desired or commanded outcome is achieved; repetition of a step or a sequence of steps can be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Compute device 100 can perform any step or sequence of steps as described in this disclosure in parallel, such as simultaneously and/or substantially simultaneously performing a step two or more times using two or more parallel threads, processor cores, or the like; division of tasks between parallel threads and/or processes can be performed according to any protocol suitable for division of tasks between iterations. Steps, sequences of steps, processing tasks, and/or data described herein can be subdivided, shared, or otherwise dealt with in various ways, for example using iteration, recursion, and/or parallel processing, without departing from the scope of this disclosure.

As shown in FIG. 1, compute device 100 includes a processor (not shown) and a memory 104 containing instructions for the processor to perform a plurality of operations. In another non-limiting embodiment, vehicle 180 can include a compute device with a memory and processor to perform similar functions of compute device 100, which is further described in FIG. 2. Compute device 100 can be located at a location remote from the vehicle 180. The compute device 100 can be, for example, a server, and can transmit signals to vehicle 180 via some network, channel, or interface. Memory 104 stores instructions for the processor of compute device 100 to query a first set of image data to produce results including a first subset of image data such as first image data subset 108. An "image data," as used in this disclosure, can be for example graphical and/or pictorial data produced by an electronic device such as a camera or sensor. In a non-limiting embodiment, an image data can include multiple image frames captured by a camera. The image data can also include a recorded video and its individual image frames. In addition and/or alternatively, the image data can further include a live feed captured by a camera. In a non-limiting embodiment, compute device 100 can store the image data in its memory 104 and/or a database (not shown in FIG. 1). In a non-limiting embodiment, an image data can include, but not limited to, information about a vehicle 180's surrounding environment, such as attributes (e.g., type, size, speed, position, relative distance, acceleration, etc.) of nearby obstacles (e.g., vehicles, buildings, pedestrians, lane dividers, sidewalks, etc.), attributes (e.g., location and size) of shoulder areas, attributes (e.g., shape and grade) of a road, weather conditions, and/or the like. The image data can also include information about vehicle 180 itself, such as the speed, location, tire pressure, internal temperature, audio being played, lights that are on or off, windshield wiper settings, window settings, tractor and trailer state, and/or the like. The image data can also include information about a driver of vehicle 180, such as the driver's posture, facial expression, heart rate, speech, movements, mental state, and/or the like. In a non-limiting embodiment, if vehicle 180 is a tractor and trailer, the image data about the tractor and trailer state can include for example information about the tractor and trailer, such as if and/or to what extent the trailer is swaying. The processor of compute device 100 can build/generate an index from all the image data collected.

As shown in FIG. 1, memory 104 of compute device 100 further stores instructions for the processor of compute device 100 to query a first set of image data to produce first image data subset 108. An "image data subset," as used in this disclosure, can be for example a resulting image data subset containing images most relevant to a query. In some instances, an image data subset can include a predefined percentage (e.g., the top 1%, the top 2%, the top 5%, the top 10%, the top 20%, the top 30%, the top 40%, or the top 50%, etc.) of image frames from the received image data and/or the index of image frames that are most relevant to the query. In some instances, first image data subset 108 can include data for between about 100 images and about 500 images of an initial image data of 10,000 images. In some instances, the image data subset can include the top 5% of image frames from the received image data and/or the index of image frames that are most relevant to the query. In some cases, the percentage for the top images can change as each new query produces increasingly accurate image data subsets. A "query," as used in this disclosure, can be for example a request for information and/or images regarding a specific driving scenario or scenario of interest. In some instances, the processor of compute device 100 can be instructed to perform the query of an image data subset such as first image data subset 108 a text-based search, an image-based search, and/or an image embedding associated with a scenario of interest. The scenario of interest further includes a description of the environment surrounding vehicle 180. For example, a query specifying a scenario of interest can include a description such as "wet road," "road work," "icy road," "harsh sunlight," "car accident," or the like thereof. In a non-limiting embodiment, compute device 100 can configure the processor to perform an image search on a description of a scenario to be queried. In a non-limiting embodiment, compute device 100 can include an initially populated index of image data stored in memory or some repository. The processor can perform the query and/or the image search using the index of image data to produce first image data subset 108. In some instances, first image data subset 108 can include image frames from the index associated with the scenario identified by the first query. For example, if a query includes "icy roads," first image data subset 108 can include image frames in the index that resembles and/or contains icy roads. In some instances, the processor of compute device 100 can be further instructed to use a classification model (e.g., a binary classification model) to produce first image data subset 108. The classification model can be an untrained model for which the processor of compute device 100 is configured to feed image data and train with embedding representations of image frames associated with a scenario identified by an initial text description. A "binary classification model," as used in this disclosure, can be for example a machine-learning model configured to classify objects into two groups indicating if an image frame is associated with a scenario or not associated with the scenario. In some instances, the classification model can be initially trained with a text-image co-occurrence, allowing a query to return relevant images denoted by first image data subset 108.

Memory 104 of compute device 100 further stores instructions for the processor of compute device 100 to receive a first set of labels 112 for the first image data subset 108. A "label," as used in this disclosure, can be for example a classification (e.g., a binary classification) denoting whether an image frame of an image data subset represents a desired scenario/"scenario of interest" for a given classification model (e.g., a given binary classification model). In some implementations, the labels (e.g., first labels 112) are provided by human users and received at the compute device 100 via an interface (e.g., a GUI). In a non-limiting embodiment, such labels can include binary labels. For example, a label can include a "yes" or "no" assignment for each image frame, where a "yes" label confirms that a frame from an image data subset such as first image data subset 108 is a frame containing an occurrence of the scenario specified in a query request. A "no" label confirms that a frame of the image data subset does not contain an occurrence of the scenario specified in the query request. It is noted that this initial search and/or query can produce image data subsets having a first accuracy, which can be below a desired predefined threshold, and the image data subsets can undergo a classification (e.g., a binary classification) to confirm if the produced image data subsets are accurate. The labels of first labels 112 confirming that a frame of first image data subset 108 contains an occurrence of a scenario of interest can be stored in a training set in memory, to train or retrain the classification model. Any label as described herein can include a binary label.

Memory 104 of compute device 100 further stores instructions for the processor of compute device 100 to train the classification model based on first labels 112 and first image data subset 108 to produce a first trained classification model 116. In a non-limiting embodiment, the processor of compute device 100 can train an untrained classification model (e.g., an untrained binary classification model) using a first training set containing first labels 112. A "first training set," as used in this disclosure, can be for example a data set including labels (e.g., binary labels) that are associated with (and/or correlated to) a desired scenario, the desired scenario being represented by a first query. In some instances, the processor of compute device 100 can be instructed to store multiple training sets in its memory, and/or in a database such as a local and/or cloud database. Memory 104 of compute device 100 further stores instructions for the processor of compute device 100 to access the database to retrieve any training set to train any classification models based on a desired scenario. A "first trained classification model" or "first trained binary classification model," as used in this disclosure, can be for example the first iteration of the training of a classification model. Memory 104 of compute device 100 further stores instructions for the processor of compute device 100 to train an untrained classification model (e.g., a binary classification model) using the first labels 112 and the first image data subset 108 as inputs, and/or using the first training set.

First trained classification model 116 is configured to generate a first plurality of scores (first scores 120) for a second image data subset 132. A "score," as used in this disclosure, can be for example a quantitative indicator of the likelihood an image frame belongs to a of interest. First trained classification model 116 generates first scores 120 for each frame in the repository, index, database, and/or memory of compute device 100. The top scoring frames are selected and/or received by compute device 100 represented by a first subset of scores such as first scores subset 124. A "subset of scores," as used in this disclosure, can be for example a subset of scores associated with a subset of image data such as an image data subset. A "second image data subset," as used in this disclosure, can be for example an image data subset different from, and more accurate than, a first image data subset regarding a desired scenario and/or scenario of interest. For example, the second image data subset 132 can include 200 frames, as contrasted with the 500 frames of the first image data subset 108. In some instances, the top scoring frames from the image frames associated with the first scores subset 124 can be or include the second image data subset 132. The scoring can be performed, for example, using a numerical range between 0 and 100, with 100 indicating the highest score and most accurate frame associated with a scenario of interest. The top scoring frames, such as all frames having a score of 75 or above, which can be, e.g., 200 frames from a total of 10,000 frames, can be identified and/or selected and denoted as second image data subset 132. The scores of these top scoring frames such as second image data subset 132 are based on first scores subset 124, where first scores subset 124 is higher than the remaining scores from first scores 120, indicating that the frames with scores that are a part of first scores subset 124 are more likely to belong to a desired scenario and/or scenario of interest.

Memory 104 of compute device 100 further stores instructions for the processor of compute device 100 to receive a second set of labels such as second labels 128. A "second label," as used in this disclosure, can be for example a label assigned to each image of a second image data subset that represents a desired scenario and/or scenario of interest which the image data subset is intended to contain and/or the classification model is intended to produce. Second labels 128 are applied to second image data subset 132. In some instances, second image data subset 132 may lack accuracy regarding a desired scenario and/or scenario of interest, however, second image data subset 132 is configured to be more accurate than that of first image data subset 108. In some instances, each frame of second image data subset 132 can include more frames containing an occurrence of a desired scenario and/or scenario of interest compared to each frame of first image data subset 108. In some instances, second labels 128 can include more labels positively confirming that a frame of second image data subset 132 contains an occurrence of the desired scenario and/or scenario of interest. The labels of second labels 128 confirming that a frame of second image data subset 132 contains an occurrence of a desired scenario and/or scenario of interest are stored in a training set such as the first training set to train first trained classification model 116.

Memory 104 of compute device 100 further stores instructions for the processor of compute device 100 to train first trained classification model 116 based on second labels 128 and second image data subset 132 to produce a second trained classification model 136. A "second trained classification model," as used in this disclosure, can be for example the second iteration of the training of a classification model. The processor of compute device 100 is further instructed to train first trained classification model 116 with second labels 128 and second image data subset 132 as inputs and/or using a second training set. A "second training set," as used in this disclosure, can be for example a training set containing a binary label correlated to a desired scenario, the desired scenario wherein the third training set contains first labels 112 and/or second labels 128. In some instances, the second training set can be a more robust version of first training set. In some instances, the processor of compute device 100 can be instructed to store the second training set in its memory 104 and/or a database such as a local and/or cloud database (not shown in FIG. 1). Second trained classification model 136 can be a more robust version of first trained classification model 116 and configured to produce more accurate results than first trained classification model 116.

Second trained classification model 136 is a second iteratively trained classification model. For example, the processor of compute device 100 can interact with a single classification model, wherein the single classification model is initially untrained. First trained classification model 116 can be the first trained version of the untrained classification model. Second trained classification model 136 can be another version of the classification model that has been retrained. Third trained classification model 156 can be the third version of the trained classification model that is trained for the third iteration. Fourth trained classification model 176 can be the fourth version of the classification model that is trained for the fourth iteration. Each subsequent trained classification model as shown in FIG. 1 is implemented on a singular classification model that is iteratively trained with newer and more robust training sets.

The processor of compute device 100 is further instructed to generate, using second trained classification model 136, a third plurality of scores such as second scores 140 for a third image data subset 152 A "second scores," as used in this disclosure, can be for example a quantitative indicator of the likelihood an image frame belongs to a desired scenario and/or scenario of interest and is more accurate than the first scores. In some instances, second scores 140 can be a rescoring of first scores 120, where second scores 140 are intended to be more accurate than first scores 120 in classifying image frames.

Second trained classification model 136 generates second scores 140 for each frame in the repository, index, database, and/or memory of compute device 100. The top scoring frames denoted by second scores 140 are selected and/or received by compute device 100 to identify a second subset of scores such as second scores subset 144. Second scores subset 144 can include the top scores of second scores 140. A "second scores subset," as used in this disclosure, can be for example a subset of scores as associated with a third image data subset. In some instances, second scores 140 can include scores closer to either ends of the numerical range of 0 and 100, indicating that second trained classification model 136 is more confident about its predictions on whether a frame belongs to a desired scenario. At higher levels of iterative training, second scores 140 can include numerical scores that are closer to either end of the range indicated by second scores 140 such as a range between 0 and 100, where each score of second scores 140 is close to or 100, indicating higher confidence of second trained classification model 136. Second scores subset 144 can include the top scores of second scores 140, for example, scores higher than 75. A "third image data subset," as used in this disclosure, is an image data subset different and more accurate than a first image data subset and a second image data subset regarding a desired scenario and/or scenario of interest. Third image data subset 152 includes image frames with scores in second scores subset 144, such as image frames with scores of 75 and higher.

The processor of compute device 100 is further instructed to receive a third set of labels such as third labels 148. A "third label," as used in this disclosure, can be for example a label assigned to each image of a third image data subset that represents a desired scenario and/or scenario of interest which the image data subset is intended to contain and/or the classification model is intended to produce. Third labels 148 are applied to third image data subset 152. In some instances, third image data subset 152 cannot be completely accurate regarding a desired scenario and/or scenario of interest, however, third image data subset 152 is configured to be more accurate than that of first image data subset 108 and second image data subset 132. In a non-limiting embodiment, each frame of third image data subset 152 can include more frames containing an occurrence of a desired scenario and/or scenario of interest compared to each frame of first image data subset 108, indicating improved predictions by second trained classification model 136. In another non-limiting embodiment, third labels 148 can include more labels positively confirming that a frame of third image data subset 152 contains an occurrence of the desired scenario and/or scenario of interest. The labels of third labels 148 confirming that a frame of third image data subset 152 contains an occurrence of a desired scenario and/or scenario of interest are stored in a training set such as the second training set to train second trained classification model 136.

The processor of compute device 100 is further instructed to train second trained classification model 136 based on third labels 148 and third image data subset 152 to produce a third trained classification model 156. A "third trained classification model," as used in this disclosure, can be for example the third iteration of the training of a classification model (e.g., a binary classification model). Memory 104 of compute device 100 further stores instructions for the processor of compute device 100 to train second trained classification model 136 with third labels 148 and third image data subset 152 as inputs and/or using a third training set. A "third training set," as used in this disclosure, can be for example a training set containing a binary label correlated to a desired scenario, the desired scenario wherein the third training set contains first labels 112, second labels 128 and third labels 148. In a non-limiting embodiment, the second training set can be a more robust version of first training set and/or second training set. In some instances, the processor of compute device 100 can store the third training set in memory 104 and/or a local and/or cloud database. Third trained classification model 156 can be a more robust version of first trained classification model 116 and/or second trained classification model 136 configured to produce more accurate results than the previous trained classification models.

Memory 104 of compute device 100 further stores instructions for the processor of compute device 100 to generate, using third trained classification model 156, a third plurality of scores such as third scores 160 for a fourth image data subset 172. A "third scores," as used in this disclosure, can be for example a quantitative indicator of the likelihood an image frame belongs to a desired scenario and/or scenario of interest and is more accurate than the first scores and the second scores. In some instances, third scores 160 can be a rescoring of second scores 140, where third scores 160 are intended to be more accurate than first scores 120 and/or second scores 140 in classifying image frames. At higher levels of iterative training, third scores 160 can include a numerical score that is either 0 or 100, or close to 0 or 100, indicating higher confidence of third trained classification model 156.

Third trained classification model 156 generates third scores 160 for each frame in the repository, index, database, and/or memory of compute device 100. The top scoring frames denoted by third scores 160 are selected and/or received by compute device 100 to identify a third subset of scores such as third scores subset 164. Third scores subset 164 can include the top scores of third scores 160. A "third scores subset," as used in this disclosure, can be for example a subset of scores as associated with a fourth image data subset. In a non-limiting embodiment, third scores 160 can include scores closer to either ends of the numerical range of 0 and 100, indicating that third trained classification model 156 is more confident than its previous trained classification models about its predictions on whether a frame belongs to a desired scenario. In another non-limiting embodiment, third trained classification model 156 can have at least one of a precision of at least about 90%. For example and without limitation, the processor of compute device 100 can be instructed to select frames with at least 90% accuracy in belonging to a desired scenario in which those frames form fourth image data subset 172. In some instances, the processor of compute device 100 can be instructed to recall the remaining frames of the total frames in its memory and/or repository that have at least about 50% accuracy in belonging to the desired scenario. For example, frames with scores and/or precision around 50% indicate an uncertainty of an image frame. Third scores subset 164 can include the top scores of third scores 160, for example, scores higher than 90. A "fourth image data subset," as used in this disclosure, is an image data subset different and more accurate than a first image data subset, a second image data subset, and/or a third image data subset regarding a desired scenario and/or scenario of interest. Fourth image data subset 172 includes image frames with scores in third scores subset 164, such as image frames with scores of 90 and higher.

Memory 104 can further instruct the processor of compute device 100 to receive a fourth set of labels such as fourth labels 168. A "fourth label," as used in this disclosure, can be for example a label assigned to each image of a fourth image data subset that represents a desired scenario and/or scenario of interest which the image data subset is intended to contain and/or the classification model is intended to produce. Fourth labels 168 are applied to fourth image data subset 172. In some instances, fourth image data subset 172 can be highly accurate with high precision regarding identifying if the frames of fourth image data subset 172 belong to a desired scenario and/or scenario of interest. In some instances, fourth image data subset 172 is configured to be more accurate than that of first image data subset 108, second image data subset 132 and/or third image data subset 152. Each frame of fourth image data subset 172 can include more frames containing an occurrence of a desired scenario and/or scenario of interest than not containing an occurrence of a desired scenario and/or scenario of occurrence, indicating improved predictions by third trained classification model 156. The labels of fourth labels 168 confirming that a frame of fourth image data subset 172 contains an occurrence of a desired scenario and/or scenario of interest are stored in a training set such as the third training set to train third trained classification model 156.

Memory 104 can further instruct the processor of compute device 100 to train third trained classification model 156 based on fourth labels 168 and fourth image data subset 172 to produce a fourth trained classification model 176. A "fourth trained classification model," as used in this disclosure, can be for example the fourth iteration of the training of a classification model. In some instances, fourth trained classification model 176 can be the final and/or fully trained classification model configured to produce the most accurate results. In another instance, memory 104 can further instruct the processor to produce only up to third trained classification model 156. For example, the classification model can be iteratively trained and/or retrained any number of times, and not limited to only four times. The processor is further instructed to cause an update to a multi-task machine-learning model 184 of a vehicle 180 such that multi-task machine-learning model 184 includes fourth trained classification model 176. A "multi-task machine-learning model," as used in this disclosure, can be for example a machine-learning model that produces update to fourth trained classification model and/or produces an updated trained classification model. For example, fourth trained classification model 176 can be highly trained that classifies image frames belonging to a desired scenario with a 90% precision but still have room to improve precision. The fourth trained classification model 176, however, is still highly trained and accurate enough to be deployed onto a vehicle such as vehicle 180 to continuously capture image frames from sensors located on vehicle 180 to classify those new image frames continuously and/or in real time.

In some implementations, the processor of compute device 100 is further instructed to train and/or retrain multiple classification models to improve precision and accuracy on determining the likelihood an image frame belongs to a desired scenario. For example and without limitation, memory 104 can further instruct the processor of compute device 100 to train fourth trained classification model 176 to produce a fifth trained classification model and thus forth, resulting an iterative machine-learning training process. In another non-limiting example, the processor can further train and/or produce scenario specific classification models (which may include binary classification models), where each classification model is designed to classify images belonging to its designated scenario. For example, the processor can create and/or train a classification model to determine if frames belong to a scenario such as "wet road condition." Another classification model can be used to determine if frames belong to a scenario such as "road work." Each classification model is catered to increasing the precision and accuracy of their respective scenarios. In some instances, each classification model from the plurality of classification models have at least one of a precision of at least about 75% or a recall of at least about 50%. This is so, at least in part, to apply different benchmarks for different scenarios of interest. For example, a classification model for classifying frames of wet roads can be more difficult than a classification model for classifying frames of snow.

Figure 2:
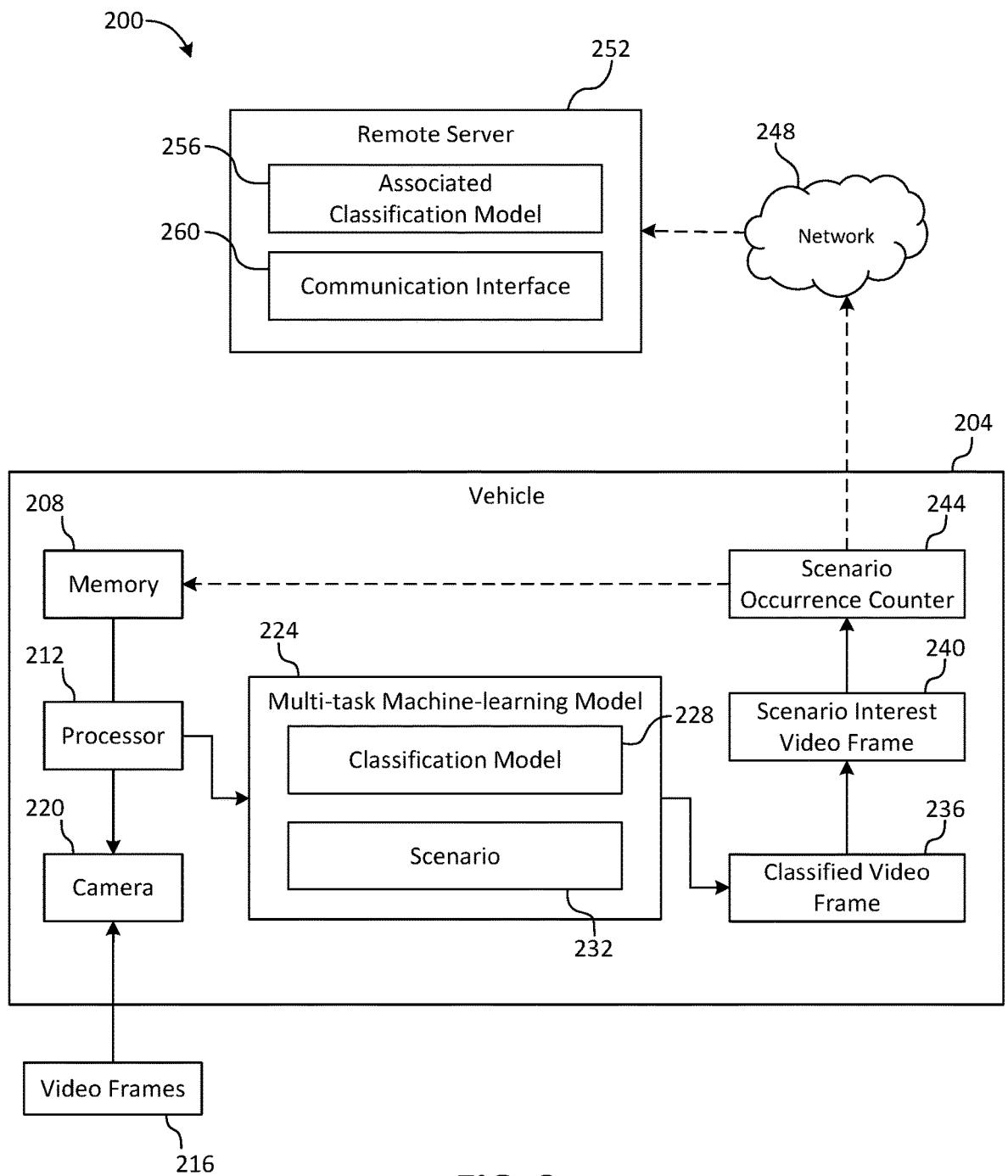
FIG. 2 is a block diagram of a system for an end-to-end machine-learning model of a vehicle, in accordance with some embodiments.

FIG. 2 is a block diagram of an exemplary embodiment of a system 200 for an end-to-end machine-learning model of a vehicle based on video frames sources, according to an embodiment. System 200 includes a vehicle 204 (e.g., an autonomous vehicle) with a processor 212 located at vehicle 204. A vehicle 204 can operate in a manual driving mode, or a vehicle can operate in a manual driving mode during one time period and operate in a partially autonomous mode or a fully autonomous driving mode during a different time period. An "autonomous vehicle," as described herein, can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Vehicle 204 can be connected to a remote device. In a non-limiting embodiment, an input can be received from a remote device. A "remote device," as used in this disclosure, can be for example a computing device, including but not limited to a mobile device such as a smartphone, tablet, laptop, desktop, and the like. The remote device can be hosted, for example, by a remote server 252. A "remote server," as used in this disclosure, can be for example a server used to host applications in a centralized zone and provide access to shared data. Vehicle 204 can include multipole electronic control units (ECUs) (not shown in FIG. 2), such as an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like. The CAN data can include for example representations of communications between the plurality of ECUs. In some implementations, the CAN data can include for example information about a state of vehicle 204, such as the vehicle's 204 speed, location, tire pressure, internal temperature, audio being played, lights that are on, windshield wiper setting, window settings, tractor and trailer state, and/or the like. Additionally, the CAN data can include information of a change of state of vehicle 204, such as a change in the vehicle's 204 speed, a change in the location of vehicle 204, a change in the vehicle's 204 tire pressure, a change in the internal temperature of vehicle 204, a change in audio being played by vehicle 204, a change in light settings of vehicle 204, a change in windshield wiper settings of vehicle 204, a change in window settings of vehicle 204, a change in tractor and trailer state of vehicle 204, and/or the like.

Remote server 252 can be connected to vehicle 204 via a network 248. A "network," as used in this disclosure, can include for example a set of compute devices such as a vehicle and a remote device and/or server sharing resources located on or provided by network nodes. In some implementations, network 248 can include a mesh network. Network 248 can be for example any suitable communications network for transferring data, operating over public and/or private networks. For example, network 248 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 248 can be a wireless network such as, for example, a Wi-Fi or wireless local area network ("WLAN"), a wireless wide area network ("WWAN"), and/or a cellular network. In other instances, network 248 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via network 248 can be encrypted or unencrypted. In some instances, the communication network 248 can include multiple networks or subnetworks operatively coupled to one another by, for example, network bridges, routers, switches, gateways and/or the like (not shown).

Vehicle 204 includes processor 212, memory 208 and/or camera 220 operatively coupled to one another via a system bus. In some implementations, processor 212, memory 208 and/or camera 220 are operatively coupled to one another via a control area network (CAN) bus included in the vehicle 204.

In some implementations, vehicle 204 can be a medium truck, heavy truck, very heavy truck, semi-truck, greater than 14,000 pounds, greater than 26,000 pounds, greater than 70,000 pounds, or greater than 80,000 pounds. In some implementations, vehicle 204 is a tractor attached to a trailer.

Processor 212 can be, for example, a hardware based integrated circuit (IC), or any other suitable processing device configured to run and/or execute a set of instructions or code. For example, processor 212 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 212 can be configured to run any of the methods and/or portions of methods discussed herein.

Camera 220 can include one or more sensors for collecting sensor data such as the image data described in FIG. 1. Camera 220 can be used to observe and gather any information that could be useful for performing the techniques discussed herein, such as information associated with a surrounding environment of vehicle 204 (e.g., nearby obstacles and their attributes, lane markers and their attributes, weather, etc.), information associated with vehicle 204 itself (e.g., speed, acceleration rate, location, lane position, etc.), and/or information about a driver of vehicle 204 (e.g., posture, facial expression, heart rate, speech, movements, mental state, etc.). Camera 220 can include, for example, at least one of a camera, a radar, a lidar, a microphone, an inertial measurement unit (IMU), and/or a gyroscope. In some implementations, camera 220 include multiple cameras, multiple radars, and multiple lidars. In some implementations, at least a portion of camera 220 are located at vehicle 204 such that a substantially 360 degree surrounding of a vehicle 200 can be determined using data collected by camera 220. In some implementations, a substantially 360 degree surrounding of vehicle 204 includes a region in front of vehicle 204, a region to the left of vehicle 204, a region to the right of vehicle 204, and a region behind vehicle 204. In some implementations, a substantially 360 degree surrounding of vehicle 204 includes at least 300 degrees around vehicle 204, at least 325 degrees around vehicle 204, at least 350 degrees, or around vehicle 204, at least 355 degrees around vehicle 204, at least 358 degrees around vehicle 204, at least 359 degrees around vehicle 204, etc. In some implementations, one or more of camera 220 are located at vehicle 204 such that a facial expression and/or body posture of a driver of vehicle 204 can be captured. For example, a camera can be located within a cabin of vehicle 204 and positioned to capture a facial expression and/or body posture of a driver of vehicle 204.

Memory 208 can be, for example, a random-access memory (RAM), a memory buffer, a hard drive, a read-only memory (ROM), an erasable programmable read-only memory (EPROM), and/or the like. In some instances, memory 208 can store, for example, one or more software programs and/or code that can include instructions to cause processor 212 to perform one or more processes, functions, and/or the like. In some embodiments, memory 208 can include extendable storage units that can be added and used incrementally. In some implementations, memory 208 can be a portable memory (e.g., a flash drive, a portable hard disk, and/or the like) that can be operatively coupled to processor 212. In some instances, memory 208 can be remotely operatively coupled with a compute device (not shown); for example, a remote database device can serve as a memory and be operatively coupled to the compute device.

Processor 212 is instructed to receive video frames 216 associated with a surrounding region of vehicle 204 and captured by camera 220 of vehicle 204. "Video frames," as used in this disclosure, can be for example a plurality of images in a sequence of pictures including a combination of images and the time of the images when exposed to a view. In some instances, video frames 216 contain images of a view such as a scenario. The scenario can include any desired scenario and/or scenario of interest as described herein. In some embodiments, video frames 216 can include multiple frames of a scenario in sequence in time such as 60 frames per second (FPS).

Processor 212 can be instructed to classify each video frame from video frames 216 using a multi-task machine-learning model 224 of vehicle 204, to produce a plurality of classified video frames. The multi-task machine-learning model is consistent with the multi-task machine-learning model as described in FIG. 1. "Classified video frames," as used in this disclosure, can be for example frames from the plurality of video frames captured by a camera that have been classified to belong to a scenario or not. The classified video frames can be determined as a function of multi-task machine-learning model 224 and/or classification model 228, which can be included in multi-task machine-learning model 224 as described herein. Multi-task machine learning model 224 can include for example multiple classification models 228, each of which can be uniquely associated with a scenario 232 from a plurality of scenarios.

Processor 212 can identify at least one classified video frame 236 from the plurality of classified video frames as being associated with a scenario of interest from the plurality of scenarios, such as scenario interest video frame 240. Multi-task machine-learning model 224 and/or classification model 228 can output a plurality of classified video frames that multi-task machine-learning model 224 and/or classification model 228 predicts to be associated with a scenario of interest. Processor 212 then identifies if those classified video frames 236 are associated with the scenario of interest. The particular scenario of interest can be queried from a remote location and/or device such as remote server 252 via a communication interface and/or network 248. Scenario interest video frame 240 can be a final confirmation that classified video frame 236 of a plurality of classified video frames belongs to a scenario of interest.

In response to identifying the at least one classified video frame 236 from the plurality of classified video frames as being associated with the scenario of interest, processor 212 is further instructed to store a store a representation of an occurrence of the scenario of interest in memory 208. The representation of the occurrence of the scenario of interest can include scenario occurrence counter 244. A "scenario occurrence counter," as used in this disclosure, can be for example a digital representation of the number of occurrences of a scenario of interest. In some instances, scenario occurrence counter 244 can include a numerical count of instances of classified video frame 236, such as scenario interest video frame 240, belonging to a scenario of interest. By storing such information in memory 208, classified video frame 236 and/or scenario interest video frame 240 can be used to further train multi-task machine-learning model 224 and/or classification model 228, thereby increasing precision in classifying similar video frames.

In response to identifying the at least one classified video frame 236 from the plurality of classified video frames as being associated with the scenario of interest, processor 212 can instead cause transmission of the representation of the occurrence of the scenario of interest, such as scenario occurrence counter 244, to remote server 252 for updating an associated classification model 256 from the plurality of classification models. An "associated classification model," as used in this disclosure, can be for example a classification model that is located at a remote server and that is associated with the scenario of interest of scenario occurrence counter 244. For example, both remote server 252 and vehicle 204 can include a classification model for classifying frames belonging to the scenario of "wet conditions." In the event classified video frame 236 and/or scenario interest video frame 240 is identified, this instance of this identification can be transmitted to remote server 252. In some embodiments, this transmission can contain classified video frame 236 and/or scenario interest video frame 240 associated with scenario occurrence counter 244, in which associated classification model 256 of remote server 252 can use that classified video frame and update its training set associated with the associated scenario of interest. This is so, at least in part, to perform additional training from at a remote location, which can have greater computational power.

Figure 3:
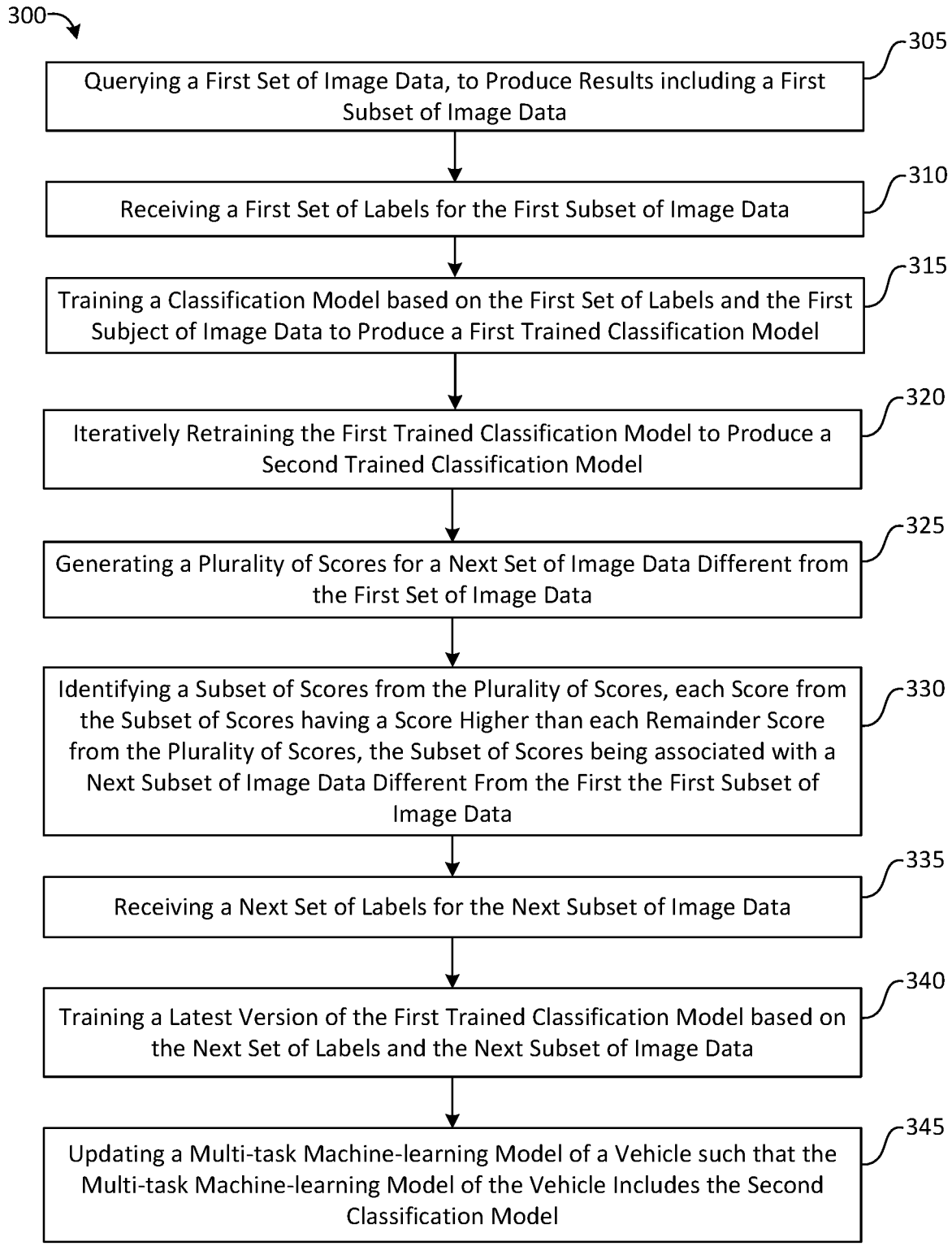
FIG. 3 is a flow diagram of a method for iterative training of an end-to-end machine-learning model, in accordance with some embodiments.

FIG. 3 shows a flow diagram of a method 300 for end-to-end machine-learning model based on video frames sources, according to an embodiment. At 305, method 300 includes querying a first set of image data, to produce results including a first subset of image data. The first subset of image data can be consistent with any first subset of image data as described in the entirety of this disclosure, such as a first image data subset as described in FIG. 1. In some instances, method 300 includes producing results where the results are identified based on index matching between a query and an index of the first subset of image data. For example, querying can include performing an image search, a text search, text-to-image search, or the like thereof. In another example, querying the first set of image data can include querying the first set of image data based on text-image co-occurrence. At 305, the first set of image data can also be queried based on a user input received via a user interface. An "input," as used in this disclosure, can include for example any entry, including textual phrases, words, letters, images, articles, journals, and/or the like. A "user interface," as used in this disclosure, can be for example an interactive compute device or software application used to facilitate human-computer interaction and communication in a device. In some implementations, the user interface can be located on a vehicle, a remote device (e.g., a mobile compute device), and/or the like. The user interface can include display screens, keyboards, a mouse, and the like thereof.

At 310, method 300 includes receiving a first set of labels for the first subset of image data. The first set of labels can be consistent with any first set of labels described in the entirety of this disclosure such as the first labels described in FIG. 1. At 310, a plurality of image data, video frames, or the like thereof, for which a first subset of image data can be used for the first set of labels, can also be received. In some implementations, the first subset of image data can be produced using an untrained classification model or a random selection of limited frames from the image data. For example, receiving the first set of labels can include assigning a binary label for each frame of the first selection of frames denoted by the first subset of image data, wherein the binary labels identifies if a frame is classified and/or belongs to a desired scenario or not. The scenario can be consistent with any scenario as described herein.

At 315, method 300 includes training a classification model (e.g., a binary classification model) based on the first set of labels and the first subset of image data, to produce a first trained classification model. The classification model can include any classification model as described in the entirety of this disclosure. The first trained classification model can include any first trained classification model as described in the entirety of this disclosure. In some implementations, training the first trained classification model can include using a first training set. The first training set can contain for example a binary label correlated to a desired scenario, wherein the desired scenario indicated by the first query.

At 320, method 300 includes iteratively retraining the first trained classification to produce a second trained classification model. Iteratively retraining can include retraining the first trained classification model with the first training set to produce the second trained classification model. In some implementations, a plurality of first classification models can be present for each scenario of interest, where each of the first trained classification models and/or each of the second trained classification models produced from the retraining of their respective first trained classification models are configured to classify an image frame as one of depicting a scenario of interest or not depicting the scenario of interest.

At 325, method 300 includes generating, via a processor, a plurality of scores for a next set of image data different from the first set of image data. The processor can be located at a vehicle or at a remote location and/or server. The plurality of scores can be consistent with any scores as described herein, such as the first scores as described in FIG. 1. The scores are applied to the next set of image data such as a second subset of image data. The second subset of image data can be consistent with the second image data subset as described in FIG. 1, where the second subset of image data is different from the first subset of image data. For example, the first subset of image data can include a subset of image data an untrained classification model (e.g., a binary classification model) believes to belong to a queried scenario. In some instances, the first subset of image data can include a randomly selected subset of image data from the original image data. In some instances, a human entity can initially select the first subset of image data to begin the iterative retraining process.

At 330, method 300 includes identifying a subset of scores from the plurality of scores, each score from the subset of scores having a score higher than each remainder score from the plurality of scores, wherein the subset of scores being associated with a next subset of image data different from the first subset of image data. This subset of scores is different from the first subset of scores and is higher than the first subset of scores. This is so, at least in part, because every iteration of retraining the classification model is configured to produce more accurate and precise results and classifications compared to the prior classification model. In some instances, each of the first trained classification model and the second trained classification model is configured to classify an image frame as one of depicting a scenario of interest or not depicting the scenario of interest. In some instances, the results of the classification models can be identified based on index matching between a query and an index of the first subset of image data. The index can be stored in memory or in a repository connected to the processor.

At 335, method 300 includes receiving, at the processor, a next set of labels for the next subset of image data. The next set of labels can include a second set of labels such as the second labels as described in FIG. 1. This second set of labels are different than the first set of labels previously described above. Receiving the second set of labels can include for example receiving them from a human entity. In some instances, the second trained classification model can classify an image frame as one of depicting a scenario of interest or not depicting the scenario of interest. For example, the second set of labels can include more labels classifying an image frame of the second subset of image frames distinct from the first subset of image frames as correctly belonging to a desired scenario.

At 340, method 300 includes training a latest version of the first trained classification model based on the next set of labels and the next subset of image data. For example, the latest version of the first trained classification model can include the second trained classification model. Training the second trained classification model can include using a second training set, where the second training set contains a binary label correlated to a desired scenario, the desired scenario wherein the third training set contains the first subset of labels and/or the second subset of labels. The second training set can be for example a more robust version of first training set. Each latest version of the first trained classification model can produce a newer version of the first trained classification model. In some cases, iteratively retraining the first trained classification model includes iteratively retraining the first trained classification model between two and five times, which can produce a fifth trained classification model.

At 345, method 300 includes updating a multi-task machine learning model of a vehicle such that the multi-task machine learning model of the vehicle includes the second trained classification model. The multi-task machine-learning model can be consistent with any multi-task machine-learning model as described herein. The multi-task machine-learning model can include for example the latest version of the first trained machine-learning model.

It is to be noted that any one or more of the aspects, instances, example, implementations and embodiments described herein can be conveniently implemented using one or more machines (e.g., one or more computing devices that are utilized as a user computing device for an electronic document, one or more server devices, such as a document server, etc.) Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory can refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory computer-readable storage medium including instructions that, when executed by at least one processor of a computing system, cause the computing system to perform operations comprising:
   training a classification model to determine at least one scenario relating to a vehicle environment based on a first subset of image data of a first set of image data and an associated first set of labels to produce a first trained classification model;
   generating, using the first trained classification model, a first plurality of scores for a second set of image data;
   selecting a second subset of image data from the second set of image data based on the first plurality of scores, each score indicating a likelihood that image data is associated with the at least one scenario relating to a vehicle environment, wherein the at least one scenario is more accurately captured in the second subset of image data compared to the first subset of image data, wherein the selecting the second subset of image data from the second set of image data is based on whether each score of the first plurality of scores satisfies a threshold value associated with a predetermined likelihood that image data is associated with the at least one scenario; and
   training the first trained classification model based on the second subset of image data and an associated second set of labels to produce a second trained classification model to determine the at least one scenario relating to a vehicle environment.

2. The non-transitory, computer-readable medium of claim 1, wherein the first set of image data includes data for between about 100 images and about 500 images.

3. The non-transitory, computer-readable medium of claim 1, wherein the first subset of image data is based on a query of the first set of image data, wherein the query specifies the scenario.

4. The non-transitory, computer-readable medium of claim 3, wherein the scenario includes a description of the vehicle environment.

5. The non-transitory, computer-readable medium of claim 3, wherein the query performs a text-based search.

6. The non-transitory, computer-readable medium of claim 3, wherein the query performs an image-based search.

7. The non-transitory, computer-readable medium of claim 3, wherein the query is based on an image embedding associated with the scenario.

8. The non-transitory, computer-readable medium of claim 1, wherein the first set of labels includes binary labels.

9. The non-transitory, computer-readable medium of claim 1, wherein the second trained classification model has at least one of a precision of at least about 75% or a recall of at least about 50%.

10. The non-transitory, computer-readable medium of claim 1, wherein the second subset of image data has fewer frames than the first subset of image data.

11. The non-transitory, computer-readable medium of claim 1, wherein the classification model is trained based on text-image co-occurrence such that, in response to a text query, the classification model returns relevant images associated with the first subset of image data.

12. A computer-implemented method comprising:
   training a classification model to determine at least one scenario relating to a vehicle environment based on a first subset of image data of a first set of image data and an associated first set of labels to produce a first trained classification model;
   generating, using the first trained classification model, a first plurality of scores for a second set of image data;
   selecting a second subset of image data from the second set of image data based on the first plurality of scores, each score indicating a likelihood that image data is associated with the at least one scenario relating to a vehicle environment, wherein the at least one scenario is more accurately captured in the second subset of image data compared to the first subset of image data, wherein the selecting the second subset of image data from the second set of image data is based on whether each score of the first plurality of scores satisfies a threshold value associated with a predetermined likelihood that image data is associated with the at least one scenario; and training the first trained classification model based on the second subset of image data and an associated second set of labels to produce a second trained classification model to determine the at least one scenario relating to a vehicle environment.

13. The method of claim 12, wherein the second trained classification model is configured to classify an image frame as one of depicting the at least one scenario or not depicting the at least one scenario.

14. The method of claim 12, wherein each of the first trained classification model and the second trained classification model is configured to classify an image frame as one of depicting the at least one scenario or not depicting the at least one scenario.

15. The method of claim 12, wherein the first subset of image data is identified based on index matching between a query and an index of the first subset of image data.

16. The method of claim 12, wherein the first trained classification model is iteratively retrained between two and five times.

17. The method of claim 12, wherein the first set of image data is queried based on text-image co-occurrence.

18. The method of claim 12, wherein the first set of image data is queried based on a user input received via a user interface.

19. The method of claim 12, wherein the first set of labels includes binary labels.

20. A system comprising:
at least one processor; and
a memory storing instructions that, when executed by the at least one processor, cause the system to perform operations comprising:
training a classification model to determine at least one scenario relating to a vehicle environment based on a first subset of image data of a first set of image data and an associated first set of labels to produce a first trained classification model;
generating, using the first trained classification model, a first plurality of scores for a second set of image data;
selecting a second subset of image data from the second set of image data based on the first plurality of scores, each score indicating a likelihood that image data is associated with the at least one scenario relating to a vehicle environment, wherein the at least one scenario is more accurately captured in the second subset of image data compared to the first subset of image data, wherein the selecting the second subset of image data from the second set of image data is based on whether each score of the first plurality of scores satisfies a threshold value associated with a predetermined likelihood that image data is associated with the at least one scenario; and
training the first trained classification model based on the second subset of image data and an associated second set of labels to produce a second trained classification model to determine the at least one scenario relating to a vehicle environment.

* * * * *